United States Patent [19]
Ducan et al.

[11] 3,960,323
[45] June 1, 1976

[54] POWDER SPRAY SYSTEM

[75] Inventors: Lane S. Ducan, Elyria; Simon Z. Tamny, Lorain; Charles H. Riedy, Lakewood, all of Ohio

[73] Assignee: Nordson Corporation, Amherst, Ohio

[22] Filed: Oct. 24, 1974

[21] Appl. No.: 517,445

Related U.S. Application Data

[60] Division of Ser. No. 259,591, June 6, 1972, Pat. No. 3,870,375, Continuation-in-part of Ser. No. 194,830, Nov. 2, 1971, Pat. No. 3,746,254.

[52] U.S. Cl. .................................... 239/3; 239/15
[51] Int. Cl.² ........................................... B05B 5/02
[58] Field of Search ................... 239/3, 15; 317/3; 118/621, 626

[56] References Cited
UNITED STATES PATENTS

| | | | |
|---|---|---|---|
| 2,659,841 | 11/1953 | Hampe | 239/15 X |
| 3,269,446 | 8/1966 | Luther | 239/15 X |
| 3,351,285 | 11/1967 | Tholome | 239/3 X |
| 3,471,089 | 10/1969 | Kock | 239/15 |
| 3,473,735 | 10/1969 | Drum | 239/3 X |
| 3,680,779 | 8/1972 | Reilly | 239/3 |
| 3,843,054 | 10/1974 | Kendall et al. | 239/15 |

*Primary Examiner*—Robert S. Ward, Jr.
*Attorney, Agent, or Firm*—Wood, Herron & Evans

[57] ABSTRACT

A coating apparatus with a powder supply system for use in a device for electrostatically spraying powder material onto the surface of an article or substrate to be coated. The system includes a powder reclaiming and recycling system which pneumatically retrieves the unused powder from the spray booths and filters the powder from the air. The filter system includes plural modules, each capable of accommodating a given number of spray guns. An automatic filter shaking system releases the powder from the filters upon command by sequentially shutting down the filter modules, one at a time, while the system is in operation. An additional filter module is provided so that adequate filtering capability is maintained while the filter shaking operation proceeds. The powder released from the filters is blown from the filters to a feeder section through a sieve which mixes new powder with the reclaimed powder under automatic control which replenishes the powder supply to the feeder. The feeder employs a fluidizing bed from which (a plurality of) plural module feeders are fed. The feeders are positioned beneath the bed and draw powder through elongated standpipes for improved powder flow control. This configuration shows complete drainage of the bed and prevents "puffing" associated with conventional fluidized bed feeders. The feeders are quickly and easily detachable from the system and can be quickly and easily replaced or disassembled for cleaning when material or color change is desired.

5 Claims, 8 Drawing Figures

Fig. 2

POWDER SPRAY SYSTEM

This is a division of application Ser. No. 259,591, filed June 6, 1972, now U.S. Pat. No. 3,870,375 and a continuation-in-part of U.S. application Ser. No. 194,830 filed Nov. 2, 1971 now U.S. Pat. No. 3,746,254.

The present invention relates to coating systems and particularly to those for supplying powder through electrostatic spray devices.

The practice of electrostatic spraying of liquid materials is now well established and quite commonly practiced commercially. Recently, however, there has been a great deal of interest and some commercial activity in electrostatic spraying of solid particulate materials. Such systems enable solid paints or other coating materials to be applied to a substrate without a liquid carrier or solvent. They therefore have the advantage of eliminating the cost of the liquid carrier or solvent which has always heretofore been required. Such systems also have the advantage of ease of application and control, less expensive application equipment, a wide range of film thicknesses is obtainable, and the problem of controlling exhaust to atmosphere is minimized or eliminated.

Electrostatic powder spray systems operate on the principle of transporting a finely divided powder, generally on the order of from 10 to 50 micron (150 mesh) to a spray gun or spray head while entrained in an air or gaseous stream. The powder is subsequently transferred from the gun to the substrate by an electrostatic charge applied to the powder and an opposite charge on the substrate. Once applied to the substrate, the powder is generally adhered as a film by heat fusion.

It is difficult in existing powder spray systems to convert from one powder to another or from one color powder to another because of the difficulty of purging the system of the first powder. Liquid spray systems overcome the problem by solvent prior to spraying the second liquid material. Dry powder systems, though, cannot tolerate a liquid in the system so that the problem of purging the system of a first spray prior to initiation of a cycle spraying a second material is relatively severe. The problem is particularly acute when changing from one color material to another in which case even a minute amount of the first material discolors the second.

One of the sections of a powder spray system which is most difficult to disassemble and clean is the feeder section. This section includes an intricate manifold containing venturi pumps with small precision orifices. Two types of feeder systems are customarily employed. Both utilize venturi pumps which generate the airpowder mixture to the spray guns. One such type is fed by a vibratory hopper positioned above the venturi pump. A second type incorporates a fluidizing bed having the venturi pump positioned within the fluidizing chamber of the bed. With the second type of feeder, the pump section is most difficult to remove before cleaning.

It has therefore been one objective of this invention to provide a feeder unit for a powder spray system which can be easily changed or removed for cleaning so that the system may be easily converted from one color or material to another in a minimum of time. This objective has been accomplished by, and one aspect of this invention is predicated upon, the concept of providing a feeder system which in combination with a fluidizing bed is mounted external thereto. This configuration allows the feeder mechanism to be rapidly removed and allows the fluid bed portion of the system to be interchanged if desired for off-line storage of powders of different types of colors. The manifold of the feeder which carries the venturi pumps is provided with a quick change connection to the fluidizer bed assembly. The input and output manifolds through which lines are connected to the pump manifold are also easily and quickly removable therefrom for disassembly, change of parts, and cleaning.

In systems of this type, it is also important that the feeder section have the capability of providing a highly controllable mixture of powder and the air. It is therefore another objective of the present invention to provide such a feeder in which material can be drawn from the hopper to the feeder in a smoothly flowing and easily controllable manner. Accordingly, the present invention is further predicated in part upon the concept of providing elongated passages between the fluidizing portion of the fluidizer bed and the feeder venturi pumps to facilitate the smooth and uniform flow of powder therethrough. This concept has the advantage that it is consistent with the above objective of providing a quick change feeder system in that it provides a feeder fed by a fluidizing bed having the feeder pumps positioned externally of the fluidizing bed where they are more accessible for quick change and cleaning.

Another important consideration in feeders of this type is the elimination of a phenomenon known as puffing. This phenomenon occurs, in one instance, upon the restarting of a pump after it has been previously used and turned off. The puffing occurs when powder settles in the feeder section or in the input ports to the feeder pump where it becomes de-fluidized and compact in this region. When the pump is restarted, this powder is ejected at high density into the spray booth and an uneven and uncontrolled deposit of material results on the object to be coated. It has been an objective of the present invention to overcome this problem by provision of a valve arrangement in the passages connecting to the feeder.

It has further been found that superior performance results when certain precise dimensional relationships are maintained in the passages within the feeder, and those connecting the feeder with the fluidizing bed. Accordingly, the present invention provides a feeder having such dimensions.

Another important consideration involved in efficiently employing powder spray systems arises from the fact that with such systems a significant portion, and in many cases, a major portion, of the powder sprayed into the booth does not adhere to the substrate surface of the article being coated. Most of this powder will either settle to the bottom of the booth, or remain suspended in the air within the booth. To efficiently operate such a powder system, it is important to reclaim and reuse this powder. The reclaiming is typically done in existing systems by exhausting, through pneumatic means, the powder from the booth and passing the air carrying the powder through separators or filter systems. Sometimes, cyclone separators are used which can effectively recover roughly in the area of three-fourths of the unused powder. Such separators can operate continuously while the system is in operation. A more effective method of retrieving the powder involves the use of a filter section, as for example, one employing bag filters. Whereas, nearly 100% of the powder can be trapped by the filters in this manner, the use of such filters has required the shutting down of the system to recover the filtered powder from the bags.

It is a further objective of the present invention to provide an efficient filter system which will permit the retrieving of the extracted powder from the filters while the system is in operation, thus avoiding the need to shut down the system or interrupt the use of the system while a changing or purging of the filters is taking place. This is extremely important in that these filters will fill quite rapidly and the shutting down of the system to empty the filters results in a significant amount of down-time for the system.

Accordingly, the present invention is further predicated in part upon the concept of providing a modular bag filter arrangement having a sufficient number of modules so that when one of the modules is shut down, the system can continue to operate utilizing the filter capacity of the other modules. The reclaiming of the powder from the filters is achieved by automatic means which respond to the pressure drop across the filters which occurs when the filters are filled with powder. During this operation, the individual modules of the filter section are sequentially de-activated and shaken to cause the powder to drop into a reclaiming receptacle. Such a shake-down procedure can be performed while the remaining modules of the system are in operation.

The present invention further provides an automatic control system which pneumatically feeds the powder retrieved from the filters from the filter receptacles and returns it to a sieve which occupies the feeder. Further automatic controls are provided to operate a make-up hopper to supply the system with new powder in proportion to the amount that is consumed in the booths.

A further aspect of the invention resides in the manner in which the reclaimed powder returned to the feeder is extracted from the air which carries it. This feature utilizes the concept of directing this reclaimed air down through the powder bed to utilize the powder itself as a diffuser to decelerate the powder to thereby collect it in the hopper to the feeder. This conveying air may be exhausted from the feeder hopper at a point immediately above the fluidized region and returned to the filters before being passed to the atmosphere.

A further aspect of the invention resides in the provision for removing electrostatic charges from the powder out of the feeders to the guns. This charge develops by mechanical action of the powder through the feeder and, when an opposite charge of that is to be applied by the electrostatic gun, will cause adhesion, lumping, and irregular spray within the booths. The means include grounded conductors in the hose between the feeders and guns to remove the charge.

These and other objectives and advantages of the present invention will be more readily apparent from the following detailed description of the drawings illustrating a powder spray system embodying principles of the present invention and in which.

Figure 1:
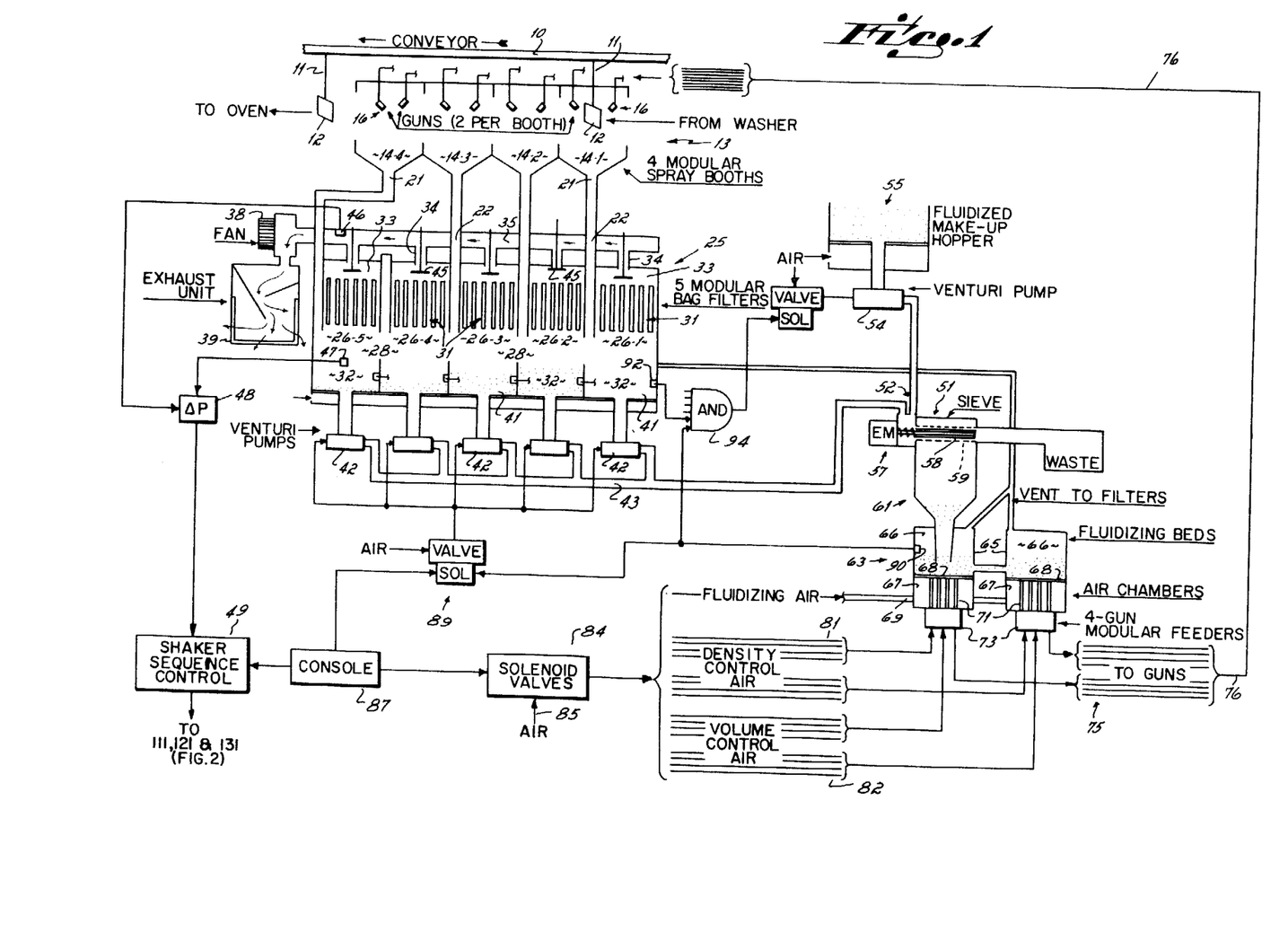
FIG. 1 is a block and schematic diagram of the system embodying the concepts of the present invention.

The diagrammatic drawing of FIG. 1 represents a powder spray system embodying the principals of the present invention. This system includes a conveyor 10 which carries hooks 11 suspended therefrom for conveying workpieces 12 through the powder spray station 13. The spray station 13 includes a series of booths 14 which are illustrated as four modular booths 14-1 through 14-4 so arranged as to provide a continuous passageway for the workpieces 12 passing therethrough. Each of the booths is provided with a pair of powder spray guns 16 which direct electro-statically charged powder into the booth environment which collects on the workpieces 12 which are oppositely charged so that the powder will be attracted to the surfaces of the workpieces 12. Only a portion of the powder sprayed will generally adhere to the workpieces 12. The rest will remain suspended in the air of the booths 14. This powder is collected and recirculated by way of exhaust ducts 21 connected to the bottoms of the booths 14.

The exhaust ducts 21 connect to inputs 22 of a bag filter section 25. The bag filter section 25 includes a plurality of bag filter modules 26. Five of these modules 26-1 through 26-5 are interconnected to form a single filter unit which makes up the section 25. Each of these modules is provided with one of the inputs 22, and each is sufficient to reclaim the powder from one of the booths 14. The number of bag filter modules 26 is one more than the number of spray booths 14 so that one of the modules may be shut down to reclaim the powder trapped therein without interfering with the capacity of the filter unit 25 to reclaim the powder from all of the booths 14. In FIG. 1, the outputs 21 of the four booths 14 are connected to inputs of only four of the bag modules 26, the module 26-4 having its input capped and unused. However, all of the modules are interconnected in such a way that powder entering any one of the inputs 22 may be filtered out through any one of the bag module units 26 by virtue of interconnecting passages 28 between each of the respective modules 26.

Each of the bag modules includes three banks 31 of nine filter bags. These filters are arranged to divide the modules 26 into two chambers, the first power-receiving chamber 32 below the bag bank 31 communicates with the inputs 22 from the booths 14. The upper chamber 33 is the exhaust air chamber which is positioned above the filter bags and communicates through an exhaust air port 34 to a common exhaust duct 35. The exhaust duct 35 of each of the booths 26 is connected to a single exhaust fan 38 which exhausts air into an exhaust unit 39. The unit 39 muffles the sound of the exhausted air and provides a final filter so that the air exhausted will be clean when passed to the atmosphere. The fan modules 38 may be more than one module as required to provide the exhaust capacity for the number of filter modules 26 used or fans of various sizes may be used.

The powder-laden air from the booths 14 passes through the ducts 21 to the input ports 22 and into the chambers 32 beneath the bag modules 31. The air from the chambers 32 passes through the bag filter modules 31 where the powder is trapped by the filters and will adhere to the outer surfaces thereof. This air is drawn by the fan 38 through the filters into the chamber 33 and out ports 34 through the duct 35 and out of the exhaust unit 39.

Each of the bag filter modules 26 is provided with a fluidized powder storage section 41 which temporarily holds the powder filtered by the bag modules 31 to the system. Each of these storage sections 41 terminates into a venturi pump 42 which exhausts the powder back into the system through a reclaiming duct 43. The bag cleaning operation proceeds whenever the pressure drop across the bag units 31 reaches a predetermined level indicating that the bags are essentially saturated with reclaimed powder. The cleaning operation is performed by first sealing the exhaust port 34 by closing a valve which is designed to block that port. This valve 45 of a given module is open when that module is in use as illustrated in connection with modules 26-1, 3, 4 and 5, but when the valve 45 is closed, as a particular module 26 is being cleaned, for example, shown in connection with the module 26-2 of the system of FIG. 1.

As shown in FIG. 1, the module 26-2 is being cleaned. This cleaning is done, as stated above, by first closing the valve 45 to block the port 34 thereby to prevent the drawing of any powder-laden air into filters 31 of that respective module 26. At the same time, and by means which will be explained in more detail below, the bag filter module 31 is shaken so that the powder will drop into the lower region 41 of the unit 26. When the level controller 90 in the feeder bed 65 senses a lower powder level, the venturi pump 42 of the respective unit is then actuated to pump this powder into the line 43.

As this reclaimed powder proceeds along the line 43, it enters a sieve section 51 through an input manifold 52. In this section, the reclaimed powder entering manifold 52 is mixed with new powder from a make-up hopper 55. The air carrying the powder passes through the sieve 51 into the feeder where the powder already in the bed 65 acts as a diffuser to decelerate and remove the reclaimed powder from the air. The low velocity air may then be exhausted from the bed 65 and fed through the filters to the exhaust. The powder from the make-up hopper 55 is pumped by a venturi device 51 to the sieve inlet port where it mixes with the reclaimed powder. The venturi 54 is actuated to pump new powder from the make-up hopper 55 whenever the powder level in the filter chamber 32 is sensed by level sensors 92 in sufficient amount to maintain the powder level to the feeders as sensed by level sensor 90. Motor 57 turns the sieve blades 58 which cause the powder to be sifted through a mesh screen 59 and drop into the feed hopper 61. The sieve unit 51 is a conventional commercially available type.

The output from the sieve drops through hopper 61 into the feeder module sections 63 which feed a powder-air mixture to the guns 16 in the spray booths 14.

The feeder sections 63 each include a fluidizer bed portion 65 which includes the fluidizing chamber 66 and an air chamber 67. Interconnecting the chambers 66 and 67 is a porous wall 68 through which air injected into the chamber 67 through port 69 passes to fluidize the powder collecting in the chamber 66. In the preferred embodiment, this fluidized powder passes through standoff tubes 71 which communicate through the air chamber 67 to a modular feeder 73. In an alternative embodiment, the porous floor 68 is sloped and the standpipes 71 connect at the side of the chamber 67 through a short nonporous sloped extension of the floor. Each feeder 73 is adapted to supply four guns with powder to be sprayed. In the eight-gun system illustrated in FIG. 1, two four-gun modular feeders are required, each fed by a separate fluidized bed 65 interconnected by a pipe so that the fluidized powder levels therein will be about equal in both beds 65. Each of these feeders 73 is provided with four hoses or outputs 75, each of which communicates through line 76 with a different one of the guns 16 positioned within the booths 14. The feeders 73 are provided with air inputs which control both the quantity and the density of the mixture being passed through the hoses 75 to the guns 16. The feeder modules 73 contain completely independent feeder sections for each of the hoses 75, each of which is controlled by one of a set of density control lines 81 and one of a set of volume control lines 82. The air on these lines 81 and 82 is controlled through solenoid valves represented diagrammatically as 84 which regulate the air to the control lines from an air supply 85. The valves are controlled through an electrical line 87 which is provided at some location convenient for operation by the system operator. The discussion below sets forth the structural details and operation of certain portions of the system, particularly the filter section 25 and the feeder section 63.

The controls for the bag shaking sequence include a pair of pressure sensors 46 and 47, a pressure difference detector 48, and a shaker sequence control 49. The pressure sensor 46 is positioned in the reclaiming duct 35 to measure the exhaust pressure, and the pressure sensor 47 is positioned within the passage 28 to measure the pressure therein. When the filters have become excessively clogged, the pressure difference between the sensors 46 and 47 will increase. Typically, the critical pressure may be four or five inches of water column. The pressure difference detector 48 will generate a signal when this pressure has been reached to initiate the shaker sequence control cycle which is determined by the control module 49. This module will sequence the shaker operation at each of the bag units 31 one at a time for approximately one minute each. The shaker control 49 operates means which will be explained in connection with the discussion of FIG. 2 below.

The reclaiming cycle control is automatic and is provided with means which include level sensors in the fluidizer bed and in each of the reclaiming chambers 41 of the filter module 25. The reclaim control includes a control solenoid operated valve 89 which operates the venturi pumps 42 by connection to an air supply upon command. Normally, this command will be responsive to a signal supplied by a powder level sensor 90 positioned near the bottom of the fluidizer bed 65 to signal when additional powder is needed. This will initiate the venturi pumps 42 to draw reclaiming powder from the modules 25 and make-up hopper 55. If the module 25 is excessively full, this level is detected by sensors 92 positioned in the regions 41 of each of the modules 26. This control deactivates the make-up hopper venturi pump and the feed hopper 66 receives powder only from the filter sections 25. This control is provided by logic represented by AND-gate 94.

Figure 2:
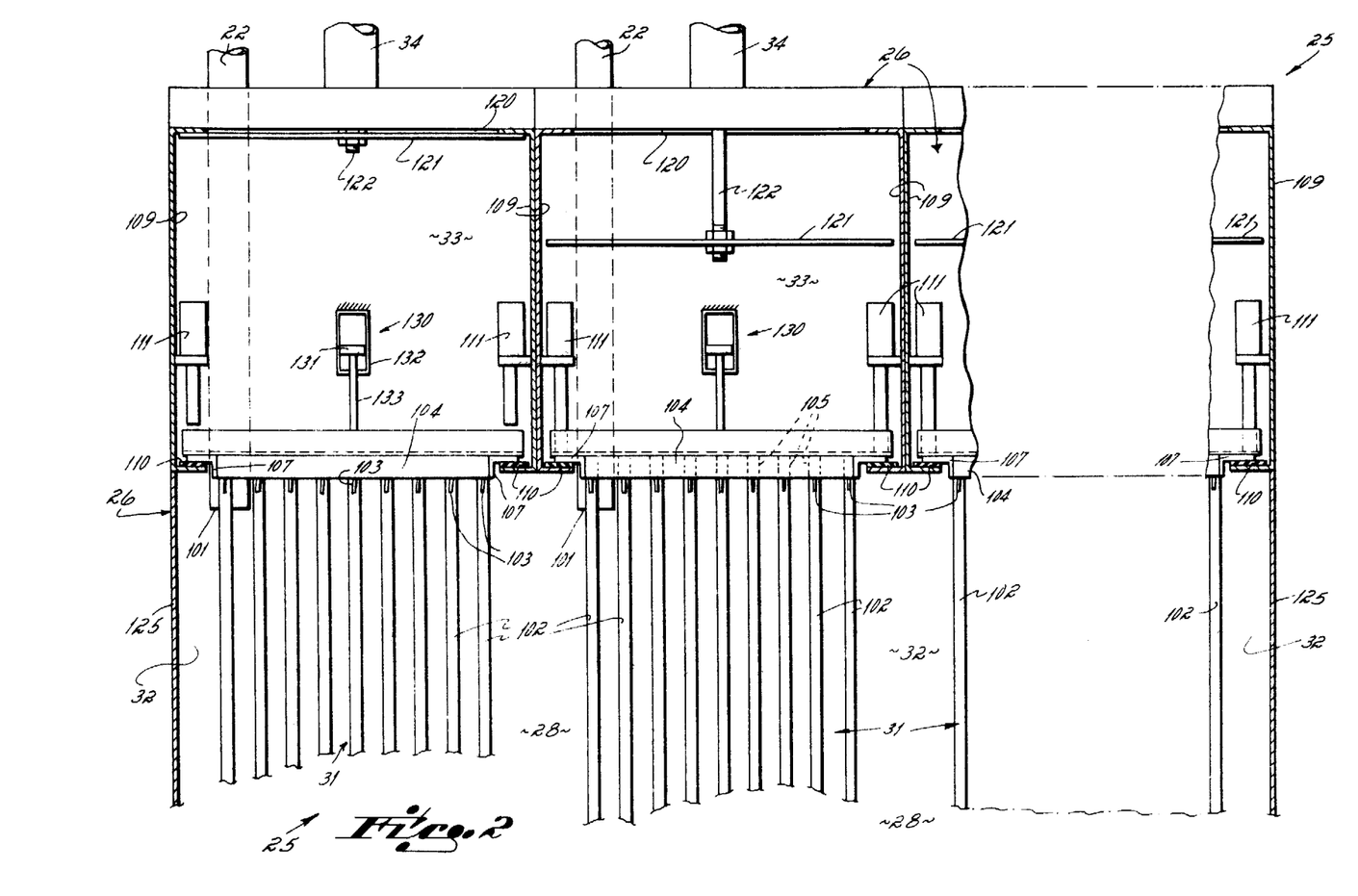
FIG. 2 is a side cross-sectional view illustrating the interior of the filter module section of the system of FIG. 1.

Referring to FIG. 2, a portion of the bag module section 25 is illustrated in cross-section. Shown are a plurality of the bag modules 26 interconnected to form the multiple module unit 25. Referring to each of the modules 26 in FIG. 2, the reclaimed powder inputs 22 is illustrated terminating at points 101 within the lower chamber 32. The bag unit section 31 includes nine bags 102 inserted about mesh or helical spring supports 103 attached to a supporting mount plate 104. The mount plate 104 is a solid plate having holes 105 therein communicating with the interiors of the bags 102. The plate 104 is mounted through brackets 107 to the housing 109 of the unit 26 through elastic mounts 110. The mounts 110 are designed in such a way that the support 104 and thus the bags 102 can be vibrated with respect to the housing 109. A set of manually operated toggle clamps or automatic pneumatic clamps 111 is provided to firmly lock the plate 104 against the mounts 110, and thus, immobilize it with respect to the housing 109. These quick-acting clamps also allow the bag cartridges to be rapidly removed from the unit and interchanged or thoroughly cleaned when changing color.

Above the bag module 31 is the chamber 33 defined by the plate 104 and the housing 109. At the upper end of this chamber 33 is the exhaust port 34 which communicates through an opening 120 in the housing 109. The valve 45 is comprised of a vertically movable valve plate 121 which is supported upon a linearly actuatable shaft 122 of a piston and cylinder (not shown) so that it may move vertically to seal or open the opening 120. In the centermost module of FIG. 2, this plate 121 is shown in its opened condition. In the leftmost module this valve plate 121 is shown in the closed condition.

Each of the modules 26 is joined so that the lower chambers 32 form a common chamber so that air may pass freely to any one of the filter units 31. For the endmost of these modules 26, a plate 125 is provided to seal the opening which would otherwise form the interconnection chamber between the adjacent modules.

Each of the modules 26 is provided with a bag shaker mechanism 130. This shaker mechanism 130 includes a reciprocating pneumatic piston 131 contained within a cylinder 132 fixed to the housing 109. The piston is connected to a rod 133 to the plate 104.

In operation, with reference first to the center module of FIG. 2, the filtration operation proceeds with the powder-laden air from the ducts 22 from the booths 14 entering through the ports 101 of the center module and into the chambers 32 defined therebelow. The air is drawn through the bag filters 102 where the powder collects on the outer surfaces thereof allowing the filtered air to pass through the openings 105 into the upper chambers 32 and out through the openings 120 and the ducts 34 where it will proceed toward the exhaust unit 39 under the power provided by the fan 37 (FIG. 1). When the bag pressure drop across the filters becomes excessive, the bag cleaning operation will proceed as follows:

First, the valve plate 121 of that module is closed to seal the opening 120 as shown in the leftmost module of the figure. At the same time, the pneumatic vibrator 130 will operate to shake the plate 104 to cause the powder to fall from the bag modules 102 to the bottom 41 (FIG. 1) of the chamber 32. The actuation of the shaker mechanism 130 occurs automatically immediately after the closing of the valve plate 121. This shaking will continue for a specified amount of time until the powder has been shaken from the bags 102. When this is completed, the shaker will stop, and the valve plate 121 will reopen to permit reuse of the filter. The clamps 111 can also be automatically actuated to release in synchronism with the shaking sequence.

By the modular filter construction, the filter modules may be designed to accommodate the requirements of one of the booths 14. Thus, as the system is expanded by the addition of more booths, an equivalent number of bag modules may be added to accommodate the system. One additional bag module is provided to allow the operation of the filter section 25 with adequate capacity when one of the modules 26 is shut down to reclaim the powder. Thus, the powder reclaiming operation may provide for each module 26 one at a time while the system is in operation.

Figures 3, 4, 5:
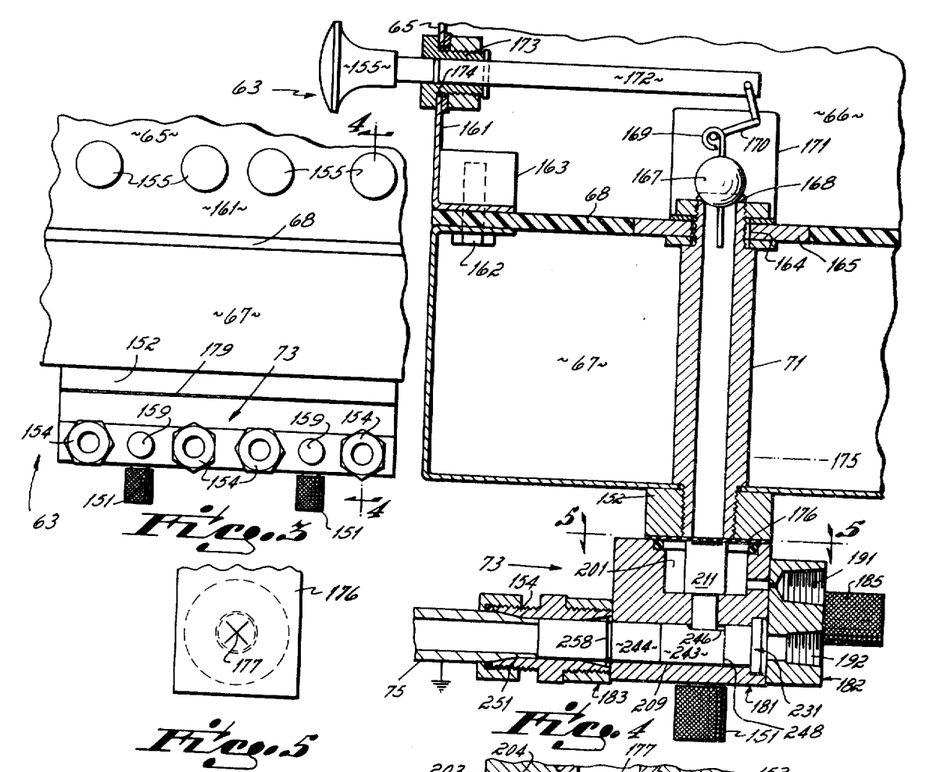
FIG. 3 is a front elevation view illustrating one of the four-pump feeder modules of the system of FIG. 1.
FIG. 4 is a cross-section view drawn to scale of the feeder of FIG. 3 taken along line 4—4 thereof.
FIG. 5 is an enlarged view of the feeder pump section of FIG. 4 drawn to twice the scale of FIG. 4 and taken along line 5—5 thereof.
Figures 4A, 6, 7:
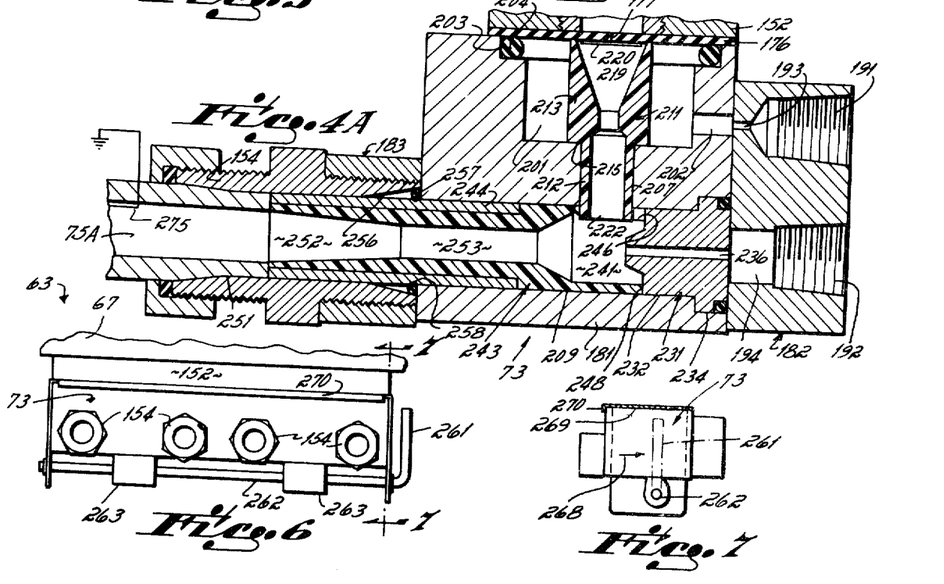
FIG. 4A is a cross-sectional view of an alternative embodiment of the charge removing means wherein a non-conductive hose has a grounded wire conductor.
FIG. 6 is a front elevational view of alternative connection means for securing the feeder manifolds to the fluidizer bed assembly.
FIG. 7 is an end view of the means of FIG. 6 taken along line 7—7 thereof.

The feeder mechanism 63 is illustrated in detail in FIGS. 3, 4 and 4A. Referring to FIG. 3, one of the two four-gun feeder modules 73 is illustrated. The feeder module 73 is removably secured through knurled headed bolts 151 to a feeder mounting block 152 rigidly secured to the base of the air chamber 67. The feeder module 73 includes four hose connectors 154 which constitute the outputs 75 which connect to the hoses 76 which feed the guns 14 (FIG. 1). The fluid bed 65, positioned above the air chamber 67 opposite the porous plate 68, has attached through its forward wall a knob 155, which operates linear actuators to open or close ports which allow the powder flow to the respective feeder sections. This is discussed more fully in connection with FIG. 4 below which is a cross-section through one of the units of the feeder 73 and the air chamber 67 and the fluid bed portion 65. The drawing of FIG. 4 is to scale, and the dimensions illustrated therein have been found effective in providing results which are far superior to prior art devices, and accordingly, the use of these dimensions are preferred.

Referring now to FIG. 4, the fluid bed 65 includes a closed wall portion 161 which is connected to the sieve hopper 61 (FIG. 1). This wall is bolted to the porous plate 68 through a bolt 162 and a nut 163. The wall 161 defines the fluidizing chamber 66. At the center of the porous plate 68 is provided a rectangular solid metal plate 165 having four holes therein, one provided for each one of the units of the feeder module 73. The powder from the sieve 51 collects in the chamber 66 while air injected through the air chamber 67 propagates upwardly through the porous plate 68 to cause the formation of a fluidized layer in the chamber 66 above the plate 68. This fluidized powder is communicated off to the feeder 73 through standpipes 71 which communicate from the hole 164 in the plate 165 downwardly through the air chamber 67 to the feeder 73. The non-porous plate 165 prevents the incidents of fluidizing air in the area immediately surrounding the hole 164, and thus, eliminates turbulent flow in this region to thereby allow more precise control of the fluidized powder mixture into the standpipe 71. The standpipes 71 are threaded at both ends. At the upper end, they are threaded into tapped holes in the base of brackets 171 which are thereby secured to the plate 165.

The flow of fluidized powder into the standpipes 71 may be turned off for servicing through actuation of ball valves 167 which seat in the upper ends 168 of the standpipes 71. These balls 167 have connected thereto hooks 169 which surround the end of a lever arm link 170 pivotally attached to the bracket 171. The level 170 is brought under the control of the actuator arm 172 which is slidably mounted in a bushing 173 secured in the hole 174 in the wall 161. The end of the arm 172 terminates in the knob 155.

The ball valve 167 may be in the form illustrated or may alternatively be in the form of a slide valve positioned approximately at point 175 on the standpipe 71. The choice of this valve position is such as will eliminate the collection of powder when the respective feeder unit is shut off. Powder collected at this point will cause an effect known as puffing when the system is re-energized. This effect is defined as that phenomenon wherein a burst of powder collected in the system is dumped from the gun at the instant of turn-on. This is undesirable in that it causes unevenly mixed spray of powder and air into the booth area.

Further, to eliminate this effect, the feeder is provided with an elastic diaphragm-type valve 176 positioned at the base of the standpipe 71. This is illustrated more clearly in FIG. 5 as being in the form of a gasket-type washer 176 with an X slit 177 in the center thereof which will open under the influence of the pressure gradient applied at this point. The air powder mixture passing through this opening 177 enters the feeder section and is drawn therein by the venturi action of the feeder section 73. It has been found that the system performs optimally when the dimensions are as illustrated in FIG. 4. With this set of dimensions, it has been found that the length of the standpipe 71 should be at least the 4¼ inch length from the ball seat at 168 to the gasket 176 as shown. The feed mechanism 73 is described in detail in FIG. 4A. FIG. 4A is drawn to a scale twice that of FIG. 4.

The feeder 73, as was explained above, was designed so that it can be easily removed from the rest of the system. This easy removal is provided through the screws 151 which cause the feeder portion 73 to separate from the air chamber mounting block 152 at the gasket 176. It is highly desirable that the feeder be easily removed from the rest of the system, particularly in that it is essential to clean the system of powder before replacing it with another powder which may be of a different type or of a different color. Typically, the feeder section 73 will be that portion of the system which is most expensive, and for this reason, quick removal and replacement of the feeder section with the spare section will allow for interchange of fluid bed hoppers for rapid color or powder type change. One fluid bed is used for each color or powder type.

The feeder section itself is also designed so that it can be cleaned with a minimum of time and effort. To so clean the feeder 73, it has been designed so that it is made up of a three part manifold. These three parts include the main venturi manifold section 181, an input manifold section 182, and an output manifold section 183. Each of these manifolds can be quickly detached from one another. For example, the input manifold 182 is mounted against the venturi manifold 181 and retained thereagainst through knurled headed screws 185. Loosening and removal of these screws will allow for quick removal of the input manifold section 182 from the venturi manifold section 181. Similarly, the output manifold section 183 can be removed from the venturi manifold section 181 by loosening of the screws 159 (FIG. 3) which hold these two manifold sections together.

Referring now to FIG. 4A, the input manifold 181 is provided with eight air input ports, two for each of the feeder sections. Only one feeder section is shown in the cross-section views of FIGS. 4 and 4A. Associated with each feeder section is a density control air input port 191 and a volume control air input port 192. Each of these ports is threaded to receive a threaded air hose connector. The connectors at the ports 191 connect to the density control air hoses 81 (FIG. 1) while the connectors at port 192 connect with the volume control air hoses 92 (FIG. 1). The input port 191 tapers to a very small air orifice 193 of a diameter of approximately .03 inches. The input port 192 terminates at a larger opening 194 which communicates with an orifice provided within the manifold 181.

The venturi manifold 181 is provided with a density control air chamber 201 which is cylindrical in shape and positioned coaxially with the standpipe 71. This chamber 201 is communicated with the orifice 193 of the density air control input port 191 through an opening 202 in the wall of the manifold 181. An enlarged portion 203 of the chamber 201 is provided at the upper end thereof to receive an o-ring 204 which seals the chamber 201 against the gasket 176. At the lower end of the chamber 201 is provided a narrowed throat 207 which connects the chamber 201 to a horizontal bore 209 which contains the venturi feeder pump. Within the throat 207 is positioned a nylon sleeve 211 which has a lower reduced diameter section 212 adapted to slipfit into the throat 207 and a larger diameter upper section 213 thereby forming a step portion 215 which rests on the lower edge of the chamber 201 to limit the downward movement of the sleeve 211 as it is inserted into the throat 207.

The sleeve 211 has a conical chamber 219 at the upper end thereof having its wider end communicating with the slit 177 and the gasket 176. The collar 211 fits snugly against the gasket 176 in an airtight relationship except in regions in which a pair of opposing slots 220 are provided which communicate between the chamber 219 and the chamber 201 in the manifold housing 181. The lower end of the collar 211 is provided with an output chamber 222 which communicates with the bore 209 in the venturi pump section of the feeder.

The bore 209 communicates between the volume control air input 192 and the output connector 154. This bore is provided with an airjet sleeve insert 231 at the control input 192. This sleeve 231 has a smaller outside diameter region 232 of a diameter equal to that of the bore 209 so that it may be inserted in slipfit fashion within the bore 209. The bore 209 also has a larger diameter section 234 at the juncture with the input manifold 182. Similarly, the sleeve 231 has a larger outside diameter collar in this region and will slip into and securely and positively position itself within the opening of the bore 209 adjacent the volume control input port 192. Concentrically positioned at the center of the sleeve 131 is a control air input orifice 236 of 0.06 inch diameter which communicates at one end with the narrow portion 194 of the input port 192 and at the other end with a chamber 241 within the bore 209 which communicates with the output end 222 of the sleeve 211.

This chamber 241 is formed within a teflon sleeve 243 which is inserted within a metal sleeve 244 which is in turn inserted within the bore 209. Each of the sleeves 243 and 244 are adapted to slipfit on each other and into the bore 209.

The sleeve 243 is provided with a notch 246 in the upper surface thereof in the region adjacent the chamber 241 to communicate with the opening 222 of the sleeve 211. The lower portion 212 of the sleeve 211 is adapted to extend downwardly into the chamber 241 so as to serve as a lock pin to prevent rotation of the sleeve 243 within the bore 209.

The end 248 of the sleeve 243 is dimensioned to abut the base of the collar 231 to limit the inward motion of the sleeve into the bore 209. The sleeves 243 and 244 are held to this centermost position by the output manifold 183 when it is secured in position. The manifold 183 has mounted therein the threaded output hose connector 154 which communicates with the output hoses. These connectors have an outlet port 251 which communicates with a tapered portion 252 of the bore 253 of the sleeve 243. The teflon hose connector 154 is provided with a taper 256 adjacent the manifold 181 to receive an o-ring 257 to seal between the manifolds 181 and 183. The o-ring 257 fits in a groove 258 in the metal sleeve 244 to trap the sleeve in position when the manifolds 181 and 183 are connected together.

When the three manifolds are disassembled or detached from each other and the feeder is removed from the assembly, all of the parts of the system can be easily removed from the feeder 73 and either replaced or reclaimed with maximum ease.

In the operation of the feeder 73, the powder is fed into the chamber 219 of the sleeve 211. Density control air is injected into the inlet port 191 and through the orifice 193 and through the opening 202 into the chamber 201 where the air will turbulently circulate until it passes through the slits 220 into the chamber 219 wherein it is mixed with the powder mixture being fed therethrough, thereby determining the density or air-to-power ratio in this area. The volume control air is injected through inlet port 192 through passage 194 and orifice 236 at high velocity into and through the chamber 241 within the sleeve 243. This air will pass through the opening 253 and the conical tapered portion 252 thereof to the outlet 251 and through the outlet hose connector 154. The chambers 236, 241 and 253 define a venturi tube which generates low pressure at the outlet 222 of the sleeve 211 to drawn the air-powder mixture from the sleeve 211 into the chamber 241 to cause it then to flow through the output 251 with the air entered from inlet 192. By regulating the amounts of air to inlets 191 and 192, the volume and density of the powder mixture at the outlet 251 is precisely controlled. The dimensions of the passages, except those in which the dimensions are specifically given above are as illustrated to scale in the scale drawings of FIGS. 4 and 4A.

FIGS. 6 and 7 illustrate alternative connection means for securing the manifolds of the feeder to the air chamber fluidizer bed assembly. These means are essentially cam-actuated clamps which snap quickly into and out of engagement to lock the feeder or release the feeder to and from the assembly. Referring to FIG. 6, this clamp means includes a lever 261 attached to a shaft 262 to which are mounted cams 263. When the lever is rotated to the position, the cams urge the feeder manifold 181 against the gasket 176 and the feeder mounting block 152. When the lever 261 is rotated by approximately 180° the cam 263 is released to loosen the block and permit its being slid away from the unit assembly. This can be seen in FIG. 76 as the direction of the arrow 268. A trackway 269 is formed as structure rigidly attached to the block 152 to receive the feeder 73 for slidable movement in the horizontal direction. The trackway is provided with a stop 270 to limit the motion and properly register the feeder with respect to the rest of the assembly to which it is attached.

Means are also provided to remove electrostatic charges from the powder mixture out of the outlets 251 of the feeders 73. This means is shown in two embodiments in FIGS. 4 and 4A. In FIG. 4, an outlet hose 75 is shown as constructed of conductive material which is electrically grounded. This hose extends from the feeder to the guns 16 in the booths 14. In FIG. 4A, a non-conductive hose 75A is shown having a grounded wire conductor 275 extending for several feet within it. The conductor should be sufficiently long so that substantially all of the particles of powder will be freed of charge as the mixture turbulently flows through the line 75A.

While we have described only a single preferred embodiment of our invention, persons skilled in the art to which this invention pertains will readily appreciate numerous changes and modifications which may be made without departing from the spirit of our invention. For example, we have described the system as one in which air is the fluid medium employed for transporting the powder from the hopper to the gun. Obviously, though, other gases which are inert with the powder may be employed with equal facility. Therefore, the terms "air" and "pneumatic" are intended and are used throughout the specification and claims in a generic sense to include all suitable gases. Other changes and modifications will also readily come to mind in the case of persons skilled in this art. Therefore, we do not intent to be limited except by the scope of the following appended claims.

Having described our invention, we claim:

1. In an electrostatic powder spray system having an electrostatic spray device which electrostatically charges the powder being sprayed therefrom and having a powder feeder for supplying an air-powder mixture to said spray device, said feeder having an output line connected to said spray device through which said mixture is so supplied, the improvement for removing from the particles of powder electrostatic charge which is opposite from that imposed by said spray device comprising:
   an electrical conductor means 75 positioned upstream of said electrostatic spray device adjacent said powder feeder to contact powder passing through said line and electrically biased with respect to said electrostatic spray device so as to discharge said powder with respect to said device before said powder is electrostatically charged at said device.

2. The improvement of claim 1 wherein:
   said conductor means is grounded with respect to the ground potential of said spray device.

3. The improvement of claim 1 wherein:
   said conductor means is in the form of an electrically conductive tube forming said line.

4. The improvement of claim 1 wherein:
   said conductor means is in the form of a wire extending a distance along the length of said line within said line.

5. A method for increasing the efficiency of an electrostatic powder spray system of the type having an electrostatic spray device for electrostatically charging solid particulate powder as the powder is sprayed therefrom,
   which method comprises the steps of removing from the particles of powder electrostatic charge opposite to that which is imposed by said-spray device upstream of the electrostatic spray device by passing said powder over an electrical conductor which is electrically biased oppositely from the electrostatic spray device, and applying an electrostatic charge to the powder as the powder is discharged from the device at a location remote from the powder discharge electrical conductors.

* * * * *